No. 879,509. PATENTED FEB. 18, 1908.
E. D. C. BAYNE & L. A. SUBERS.
FLEXIBLE TIRE FRAME.
APPLICATION FILED FEB. 19, 1907.
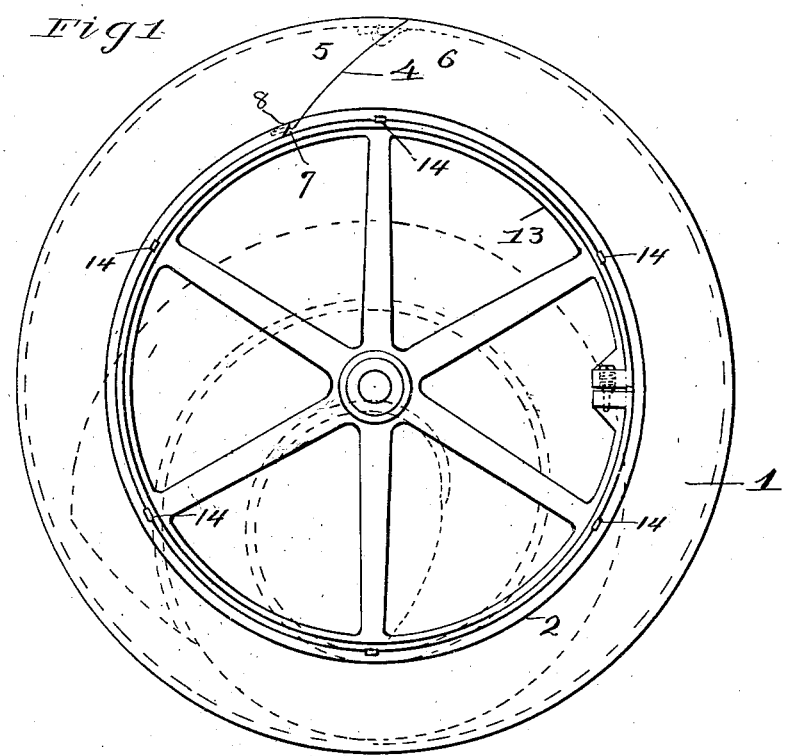
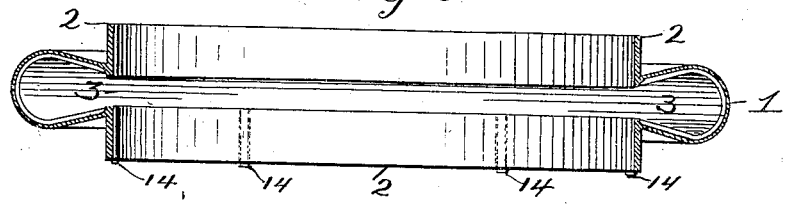
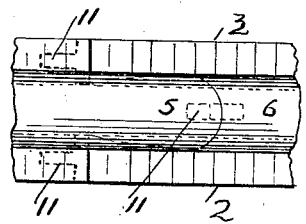
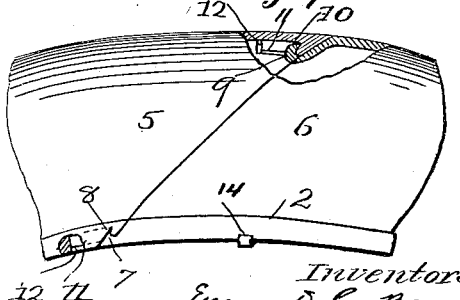
Witnesses
Inventors,
Eugene D. C. Bayne
Lawrence A. Subers
by Wm. M. Monroe
Attorney.

UNITED STATES PATENT OFFICE.

EUGENE D. C. BAYNE AND LAWRENCE A. SUBERS, OF CLEVELAND, OHIO.

FLEXIBLE TIRE-FRAME.

No. 879,509.

Specification of Letters Patent.

Patented Feb. 18, 1908.

Application filed February 19, 1907. Serial No. 358,181.

*To all whom it may concern:*

Be it known that we, EUGENE D. C. BAYNE and LAWRENCE A. SUBERS, citizens of the United States, and residents of Cleveland, county of Cuyahoga, State of Ohio, have invented certain new and useful Improvements in Flexible Tire-Frames, of which we hereby declare the following to be a full, clear, and exact description, such as will enable others skilled in the art to which it appertains to make and use the same.

The objects of the invention are to obtain a highly polished circular frame of flexible material upon which a tire can be wound comprising insulated threads arranged in alternating transversely and circumferentially disposed layers therein.

A further object is to provide a frame formed in one integral piece, and not formed of separable portions designed to be secured together while the tire is wound thereon and afterward taken apart to facilitate removing the tire such as is shown and described in our application for Letters Patent of the United States, Ser. No. 344,094, filed November 19th, 1906, in connection with an automatic machine for winding tires. The frame described therein is strictly collapsible and is composed of several separable portions, and is secured upon an expansible wheel rim which is a portion of the machine. The device described herein is of a wholly different order of construction, and is adapted to take the place in said machine of the collapsible frame employed therein and can be directly placed upon and secured to the expansible wheel rim, and is adapted for use in precisely the same manner as the collapsible frame therein described. The frame comprises an integral annular tube of highly polished vulcanite or similar hard substances having some degree of flexibility, and parted at one side to permit of separation of its ends.

The invention also comprises devices for interlocking the engaging surfaces of the opposed extremities so as to bring the extremities into perfect alinement with each other and maintain a perfectly smooth and continuous outer surface when the extremities are united.

The invention comprises further means for securing the frame to its support, and consists in the combination and arrangement of parts and construction of the various details as hereinafter described, shown in the accompanying drawings and specifically pointed out in the claims.

In the accompanying drawings, Figure 1 is an elevation of the improved form of frame showing the line of separation of the extremities and the expansible wheel rim on which it is secured; Fig. 2 is a central transverse section thereof; Fig. 3 is a plan view of a portion thereof showing the meeting extremities; Fig. 4 is a side elevation of the same slightly enlarged.

In these views 1 is the highly polished annular frame nearly tubular and provided with an annular laterally extending rim 2 on either side of the central opening 3 on the inner edge. The conformation of the frame is such that a tire such as described in an accompanying application Serial No. 344,093 can readily be wound thereon.

A line of parting or division is shown at 4, in one side of the annular frame, which divides this side so that the closely fitting extremities 5 and 6 can be separated from each other so that the frame can be withdrawn from the completed tire. This action can be accomplished by bending one of the extremities as 6, so that it will pass underneath the other in a substantially involute form as shown in dotted lines in Fig. 1. To facilitate this action and to permit the extremities to separate readily the parting surfaces are not on a radial plane but are on an inclined arc the axis being taken at approximately a quarter of the circle distant from the surfaces of separation, so that the inner extremity will readily slide upon the outer extremity. The circle of the frame can then be reduced in diameter until it can be removed from the tire. If desired, however, as soon as one of the extremities is withdrawn by this sliding movement from the tire the extremities can be separated laterally until the frame can be screwed out of the tire by merely revolving it. The extremities are locked together so as to secure them in perfect alinement by means of the hooks 7 on the inner margin or rim 2 of one extremity as 6, and corresponding recesses 8 in the other extremity. At the outer or tread surface a similar locking hook 9 is shown in one extremity and a corresponding recess 10 in the other. These hooks or shoulders interlock on the outward movement of the parts but separate readily when the part 6 is bent downward. Tongues 11, 11 in one part enter recesses 12, 12 in the other part to prevent one part from slipping sidewise upon the other. This annular frame is mounted upon an expansible wheel rim 13, by means of which it is rotated, and keys 14 inserted in the inner edges of the frame center it and prevent it from slipping laterally thereon, but do not prevent withdrawing it from the other side.

In practice the tire is wound upon the frame while upon the wheel rim, and when the frame is removed therefrom, the frame is contracted or bent to remove the tire.

Having described our invention what we claim as new and desire to secure by Letters Patent is:

1. A tire frame comprising an annular flexible tube having overlapping extremities, a rotatable support therefor, and means for alining said frame upon said support, comprising keys inserted in the inner edge of the frame and bearing against the edge of said support, substantially as described.

2. A flexible ring shaped tire frame, of horse-shoe shaped cross section and provided with laterally extending flanges 2 on its inner edges, and transversely parted at one side with an inclined and curved parting line, integral hooks 7 upon one set of meeting edges of said flanges, and corresponding recesses 8 upon the opposed extremities at the tread surface thereof and a corresponding recess 10 in the other extremity and tongues 11, 11 in one extremity and recesses 12, 12 in the other extremity, registering therewith, substantially as described.

In testimony whereof we hereunto set our hands this 16th day of February, 1907, at Cleveland, Ohio.

EUGENE D. C. BAYNE.
LAWRENCE A. SUBERS.

In presence of—
A. T. OSBORN,
Z. B. SAWYER.